(12) United States Patent
Wang et al.

(10) Patent No.: US 10,149,181 B2
(45) Date of Patent: Dec. 4, 2018

(54) SIGNAL OUTPUT APPARATUS, BOARD, AND SIGNAL OUTPUT METHOD

(71) Applicant: HUAWEI TECHNOLOGIES CO., LTD., Shenzhen (CN)

(72) Inventors: Haoran Wang, Shenzhen (CN); Yecun Huang, Shenzhen (CN); Qiang Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/907,232

(22) Filed: Feb. 27, 2018

(65) Prior Publication Data

US 2018/0192306 A1 Jul. 5, 2018

(30) Foreign Application Priority Data

Aug. 27, 2015 (CN) .......................... 2015 1 0535719

(51) Int. Cl.
| | |
|---|---|
| *H04W 24/00* | (2009.01) |
| *H04W 24/02* | (2009.01) |
| *H04W 24/06* | (2009.01) |
| *H04W 52/22* | (2009.01) |
| *H04B 17/26* | (2015.01) |
| *H04B 17/29* | (2015.01) |
| *H04B 17/16* | (2015.01) |
| *H04B 17/00* | (2015.01) |

(52) U.S. Cl.
CPC ............ *H04W 24/02* (2013.01); *H04B 17/26* (2015.01); *H04W 24/06* (2013.01); *H04W 52/225* (2013.01); *H04B 17/0087* (2013.01); *H04B 17/16* (2015.01); *H04B 17/29* (2015.01); *Y02D 70/00* (2018.01)

(58) Field of Classification Search
CPC ................ H04B 17/00; H04B 17/0085; H04B 17/0087; H04B 17/16; H04B 17/29; H04W 24/00; H04W 24/06; H04W 24/08
See application file for complete search history.

(56) References Cited

U.S. PATENT DOCUMENTS

| | | | | |
|---|---|---|---|---|
| 9,614,627 | B2 * | 4/2017 | Yu ....................... | H04B 17/0085 |
| 2002/0183054 | A1 * | 12/2002 | Rimoni .............. | H04B 17/0085 |
| | | | | 455/423 |
| 2005/0207333 | A1 * | 9/2005 | Rotstein .................... | H04B 7/06 |
| | | | | 370/203 |
| 2009/0131044 | A1 | 5/2009 | Marini et al. | |
| 2009/0310492 | A1 * | 12/2009 | Kazmi .................. | H04L 5/0007 |
| | | | | 370/241 |

(Continued)

FOREIGN PATENT DOCUMENTS

| | | |
|---|---|---|
| CN | 101389107 A | 3/2009 |
| CN | 101437281 A | 5/2009 |

(Continued)

*Primary Examiner* — Duc M Nguyen
(74) *Attorney, Agent, or Firm* — Kilpatrick Townsend & Stockton LLP (57) ABSTRACT

The present invention discloses a signal output apparatus, a board, and a signal output method. UE signals to be output are grouped, and UE signals having similar powers are combined and are then output by using one same antenna. This resolves a problem that a low-power UE signal is distorted when a large quantity of UE signals are output from an air interface.

18 Claims, 4 Drawing Sheets

(56) References Cited

U.S. PATENT DOCUMENTS

| | | | |
|---|---|---|---|
| 2012/0128088 A1* | 5/2012 | Ko | H04B 7/0465 375/260 |
| 2014/0098690 A1* | 4/2014 | Siomina | G01S 5/12 370/252 |
| 2014/0098691 A1* | 4/2014 | Kazmi | G01S 5/12 370/252 |
| 2015/0117225 A1 | 4/2015 | Devarasetty et al. | |
| 2015/0146805 A1* | 5/2015 | Terry | H04L 25/0204 375/260 |
| 2015/0280844 A1* | 10/2015 | Yu | H04B 17/0085 375/224 |
| 2015/0333946 A1* | 11/2015 | Terry | H04B 17/354 370/252 |

FOREIGN PATENT DOCUMENTS

| | | |
|---|---|---|
| CN | 101442367 A | 5/2009 |
| CN | 102111798 A | 6/2011 |
| CN | 102142872 A | 8/2011 |
| CN | 102316505 A | 1/2012 |
| CN | 105142173 A | 12/2015 |
| EP | 1760978 A1 | 3/2007 |
| EP | 1474942 B1 | 5/2007 |
| EP | 2434657 A2 | 3/2012 |
| WO | 03069814 A2 | 8/2003 |
| WO | 2015018039 A1 | 2/2015 |

\* cited by examiner

SIGNAL OUTPUT APPARATUS, BOARD, AND SIGNAL OUTPUT METHOD

CROSS-REFERENCE TO RELATED APPLICATIONS

This application is a continuation of International Application No. PCT/CN2016/070814, filed on Jan. 13, 2016, which claims priority to Chinese Patent Application No. 201510535719.X, filed on Aug. 27, 2015, both of which are hereby incorporated by reference in their entireties.

TECHNICAL FIELD

The present invention relates to the field of wireless communications technologies, and in particular, to a signal output apparatus, a board, and a signal output method.

BACKGROUND

As a wireless communications network develops in aspects such as topology, user capacity, access technology, and data throughput rate, how to test stability of a new cell, a base station, and even an entire coordination network in an ultimate-capacity case by using limited devices and limited antenna ports becomes a problem urgently needing to be resolved in the test field.

In actual application, a user equipment (UE for short) simulation device may be used to text stability of a network-side device (for example, a base station) in an ultimate-capacity state. The UE simulation device may generate a large quantity of UE signals by using an architecture of "digital signal processor (English: Digital Signal Processor, DSP for short)+field-programmable gate array (English: Field-Programmable Gate Array, FPGA for short)", and output the UE signals by using a cable or an air interface. However, when the UE signals are output by using an air interface, the UE simulation device has limited antennas, and usually has a few of or tens of limited antennas, but there may be hundreds, thousands, or even ten thousands of simulated UE signals. Therefore, when the quantity of the simulated UE signals is far greater than the quantity of the antennas of the UE simulation device, some UE signals need to be combined, and the combined UE signals are sent by using one antenna. A simulated UE signal is usually a digital signal. Therefore, when a large quantity of UE signals are combined, because a high-power UE signal has a relatively large quantization error during quantization, the quantization error of the high-power UE signal inevitably covers that of a low-power UE signal, causing distortion of the low-power UE signal. Consequently, decoding on the low-power UE signal on the network-side device fails, corresponding UE cannot communicate with the network-side device, and test accuracy of stability of the network-side device in the ultimate-capacity state is affected.

Therefore, a test device and method that can output a UE signal from an air interface without distortion are needed.

SUMMARY

Embodiments of the present invention provide a signal output apparatus, a board, and a signal output method, so as to resolve a problem that some of UE signals are distorted when an existing device outputs the UE signals from an air interface.

According to a first aspect, an embodiment of the present invention provides a signal output apparatus, including:

a virtual UE module, configured to generate multiple UE baseband signals;

a channel simulation module, configured to add a radio frequency characteristic to each of the multiple UE baseband signals generated by the virtual UE module, to obtain multiple UE characteristic signals;

a radio frequency module, where the radio frequency module includes N radio frequency units; and a signal grouping and conversion module, configured to: generate N signal groups according to the multiple UE characteristic signals obtained by the channel simulation module, where each signal group includes at least one of the multiple UE characteristic signals, and the N signal groups form a UE characteristic signal set that is the same as a set including the multiple UE characteristic signals obtained by the channel simulation module; and combine UE characteristic signals included in each of the N signal groups, and respectively bind N combined signals obtained through combination to the N radio frequency units included in the radio frequency module; where a ratio of a sum of peak powers of the UE characteristic signals included in each signal group to a sum of average powers within a specified power identification duration is not greater than a specified peak-to-average power ratio PAPR threshold; and the radio frequency module is configured to respectively output, by using antennas connected to the N radio frequency units, the combined signals that are bound by the signal grouping and conversion module to the N radio frequency units.

With reference to the first aspect, in a first possible implementation of the first aspect, the signal grouping and conversion module is specifically configured to:

generate M first signal groups according to the multiple UE characteristic signals obtained by the channel simulation module, where each first signal group includes at least one of the multiple UE characteristic signals, and the M first signal groups form a UE characteristic signal set that is the same as the set including the multiple UE characteristic signals obtained by the channel simulation module, where M is a quantity of radio frequency unit groups included in the apparatus, and each radio frequency unit group includes at least one radio frequency unit; and bind the generated different first signal groups to different radio frequency unit groups, and perform the following operations for each radio frequency unit group:

grouping UE characteristic signals included in a first signal group bound to the radio frequency unit group into n second signal groups according to the specified power identification duration, the specified PAPR threshold, and a quantity n of radio frequency units included in the radio frequency unit group, so that a ratio of a sum of peak powers of UE characteristic signals included in any second signal group to a sum of average powers within the power identification duration is not greater than the PAPR threshold; and combining UE characteristic signals included in each of the n second signal groups obtained through grouping, and binding n combined signals obtained through combination to n radio frequency units included in the radio frequency unit group, where a sum of quantities of n second signal groups that are separately obtained for the different radio frequency unit groups is the N signal groups.

With reference to the first aspect, in a second possible implementation of the first aspect, the virtual UE module includes:

a CPU, configured to generate the multiple UE baseband signals; and a DSP and/or an FPGA, configured to accelerate the generation of the multiple UE baseband signals.

With reference to any one of the first aspect or the first to the second possible implementations of the first aspect, in a third possible implementation of the first aspect, the virtual UE module is specifically configured to:

generate multiple UE physical layer signals according to a specified service model or an application APP installed in the apparatus; and perform baseband processing on each of the generated UE physical layer signals, to obtain the multiple UE baseband signals.

With reference to the first possible implementation of the first aspect, in a fourth possible implementation of the first aspect, the radio frequency module further includes a radio frequency signal processing chip;

the radio frequency signal processing chip is configured to respectively process the N combined signals that are bound by the signal grouping and conversion module to the N radio frequency units, to obtain N radio frequency signals;

each radio frequency unit group is mapped to one antenna port, and each radio frequency unit is connected to one physical antenna; and a first radio frequency unit is specifically configured to output, by using a physical antenna connected to the first radio frequency unit and an antenna port to which a radio frequency unit group to which the first radio frequency unit belongs is mapped, a radio frequency signal that is obtained by the radio frequency signal processing chip by processing a combined signal bound to the first radio frequency unit.

With reference to any one of the first aspect or the first to the fourth possible implementations of the first aspect, in a fifth possible implementation of the first aspect, the first radio frequency unit is specifically configured to:

determine a transmit power of the first radio frequency unit; and output, based on the determined transmit power by using the antenna connected to the first radio frequency unit, the combined signal that is bound by the signal grouping and conversion module to the first radio frequency unit, where the transmit power is a sum of powers of UE characteristic signals included in the combined signal that is bound by the grouping and conversion module to the first radio frequency unit.

According to a second aspect, an embodiment of the present invention provides a board, including:

a processor, configured to: generate multiple UE baseband signals; and add a radio frequency characteristic to each of the generated multiple UE baseband signals, to obtain multiple UE characteristic signals;

a radio frequency module, where the radio frequency module includes N antennas; where the processor is further configured to: generate N signal groups according to the obtained multiple UE characteristic signals, where each signal group includes at least one of the multiple UE characteristic signals, and the N signal groups form a UE characteristic signal set that is the same as a set including the obtained multiple UE characteristic signals; and combine UE characteristic signals included in each of the N signal groups, and respectively bind N combined signals obtained through combination to the N antennas included in the radio frequency module;

a ratio of a sum of peak powers of the UE characteristic signals included in each signal group to a sum of average powers within a specified power identification duration is not greater than a specified peak-to-average power ratio PAPR threshold; and the radio frequency module is configured to respectively output, by using the N antennas, the combined signals that are bound by the processor to the N antennas.

With reference to the second aspect, in a first possible implementation of the second aspect, the processor is specifically configured to:

generate M first signal groups according to the obtained multiple UE characteristic signals, where each first signal group includes at least one of the multiple UE characteristic signals, and the M first signal groups form a UE characteristic signal set that is the same as the set including the obtained multiple UE characteristic signals, where M is a quantity of antenna groups included in the radio frequency module, and each antenna group includes at least one antenna; and bind the generated different first signal groups to different antenna groups, and perform the following operations for each antenna group:

grouping UE characteristic signals included in a first signal group bound to the antenna group into n second signal groups according to the specified power identification duration, the specified PAPR threshold, and a quantity n of antennas included in the antenna group, so that a ratio of a sum of peak powers of UE characteristic signals included in any second signal group to a sum of average powers within the power identification duration is not greater than the PAPR threshold; and combining UE characteristic signals included in each of the n second signal groups obtained through grouping, and binding n combined signals obtained through combination to n antennas included in the antenna group, where a sum of quantities of n second signal groups that are separately obtained for the different antenna groups is the N signal groups.

With reference to the second aspect, in a second possible implementation of the second aspect, the processor includes:

a CPU, configured to generate the multiple UE baseband signals; and a DSP and/or an FPGA, configured to accelerate the generation of the multiple UE baseband signals.

With reference to any one of the second aspect or the first to the second possible implementations of the second aspect, in a third possible implementation of the second aspect, when generating the multiple UE baseband signals, the processor is specifically configured to:

generate multiple UE physical layer signals according to a specified service model or an APP installed in the apparatus; and perform baseband processing on each of the generated UE physical layer signals, to obtain the multiple UE baseband signals.

With reference to the first possible implementation of the second aspect, in a fourth possible implementation of the second aspect, the radio frequency module further includes a radio frequency signal processing chip;

the radio frequency signal processing chip is configured to process the N combined signals that are bound by the processor to the N antennas, to obtain N radio frequency signals;

each antenna group is mapped to one antenna port; and a first antenna is specifically configured to output, by using an antenna port to which an antenna group to which the first antenna belongs is mapped, a radio frequency signal that is obtained by the radio frequency signal processing chip by processing a combined signal bound to the first antenna.

With reference to any one of the second aspect or the first to the fourth possible implementations of the second aspect, in a fifth possible implementation of the second aspect, the first antenna is specifically configured to:

determine a transmit power of the first antenna; and output, based on the determined transmit power, the combined signal that is bound by the processor to the first antenna, where the transmit power is a sum of powers of UE characteristic signals included in the combined signal that is bound by the processor to the first antenna.

According to a third aspect, an embodiment of the present invention provides a signal output method, including:

generating multiple UE baseband signals;

adding a radio frequency characteristic to each of the generated multiple UE baseband signals, to obtain multiple UE characteristic signals;

generating N signal groups according to the obtained multiple UE characteristic signals, where each signal group includes at least one of the multiple UE characteristic signals, and the N signal groups form a UE characteristic signal set that is the same as a set including the obtained multiple UE characteristic signals; and combining UE characteristic signals included in each of the N signal groups, and respectively binding N combined signals obtained through combination to N radio frequency units, where a ratio of a sum of peak powers of the UE characteristic signals included in each signal group to a sum of average powers within a specified power identification duration is not greater than a specified peak-to-average power ratio PAPR threshold; and respectively outputting, by using antennas connected to the N radio frequency units, the N combined signals that are bound to the N radio frequency units.

With reference to the third aspect, in a first possible implementation of the third aspect, the generating N signal groups according to the obtained multiple UE characteristic signals, combining UE characteristic signals included in each of the N signal groups, and respectively binding the N combined signals obtained through combination to N radio frequency units includes:

generating M first signal groups according to the obtained multiple UE characteristic signals, where each first signal group includes at least one of the multiple UE characteristic signals, and the M first signal groups form a UE characteristic signal set that is the same as the set including the obtained multiple UE characteristic signals, where M is a quantity of radio frequency unit groups, and each radio frequency unit group includes at least one radio frequency unit; and binding the generated different first signal groups to different radio frequency unit groups, and performing the following operations for each radio frequency unit group:

grouping UE characteristic signals included in a first signal group bound to the radio frequency unit group into n second signal groups according to the specified power identification duration, the specified PAPR threshold, and a quantity n of radio frequency units included in the radio frequency unit group, so that a ratio of a sum of peak powers of UE characteristic signals included in any second signal group to a sum of average powers within the power identification duration is not greater than the PAPR threshold; and combining UE characteristic signals included in each of the n second signal groups obtained through grouping, and binding n combined signals obtained through combination to n radio frequency units included in the radio frequency unit group, where a sum of quantities of n second signal groups that are separately obtained for the different radio frequency unit groups is the N signal groups.

With reference to the third aspect, in a second possible implementation of the third aspect, the method further includes:

accelerating the generation of the multiple UE baseband signals.

With reference to any one of the third aspect or the first to the second possible implementations of the third aspect, in a third possible implementation of the third aspect, where the generating multiple UE baseband signals includes:

generating multiple UE physical layer signals according to a specified service model or an installed application APP; and performing baseband processing on each of the generated UE physical layer signals, to obtain the multiple UE baseband signals.

With reference to the first possible implementation of the third aspect, in a fourth possible implementation of the third aspect, each radio frequency unit group is mapped to one antenna port, and each radio frequency unit is connected to one physical antenna; and the respectively outputting, by using antennas connected to the N radio frequency units, the N combined signals that are bound to the N radio frequency units includes:

processing, by using the radio frequency signal processing chip, a combined signal that is bound to a first radio frequency unit, to obtain a radio frequency signal; and outputting the radio frequency signal by using a physical antenna connected to the first radio frequency unit and an antenna port to which a radio frequency unit group to which the first radio frequency unit belongs is mapped.

With reference to any one of the third aspect or the first to the fourth possible implementations of the third aspect, in a fifth possible implementation of the third aspect, the respectively outputting, by using antennas connected to the N radio frequency units, the N combined signals that are bound to the N radio frequency units includes:

determining a transmit power of the first radio frequency unit; and outputting, based on the determined transmit power by using the antenna connected to the first radio frequency unit, the combined signal that is bound to the first radio frequency unit, where the transmit power is a sum of powers of UE characteristic signals included in the combined signal that is bound to the first radio frequency unit.

By means of the solutions provided in the embodiments of the present invention, UE signals that are to be output are grouped, and UE signals having similar powers are combined and are then output by using one antenna. This resolves a problem that a low-power UE signal is distorted when a large quantity of UE signals are output from an air interface.

DESCRIPTION OF EMBODIMENTS

Embodiments of the present invention provide a signal output apparatus, a board, and a signal output method. UE signals that are to be output are grouped, and UE signals having similar powers are combined and are then output by using one antenna. This solves a problem that a low-power UE signal is distorted when a large quantity of UE signals are output from an air interface.

The technical solutions in the embodiments of the present invention are described in the following with reference to the accompany drawings and the embodiments in this specification.

Figure 1:
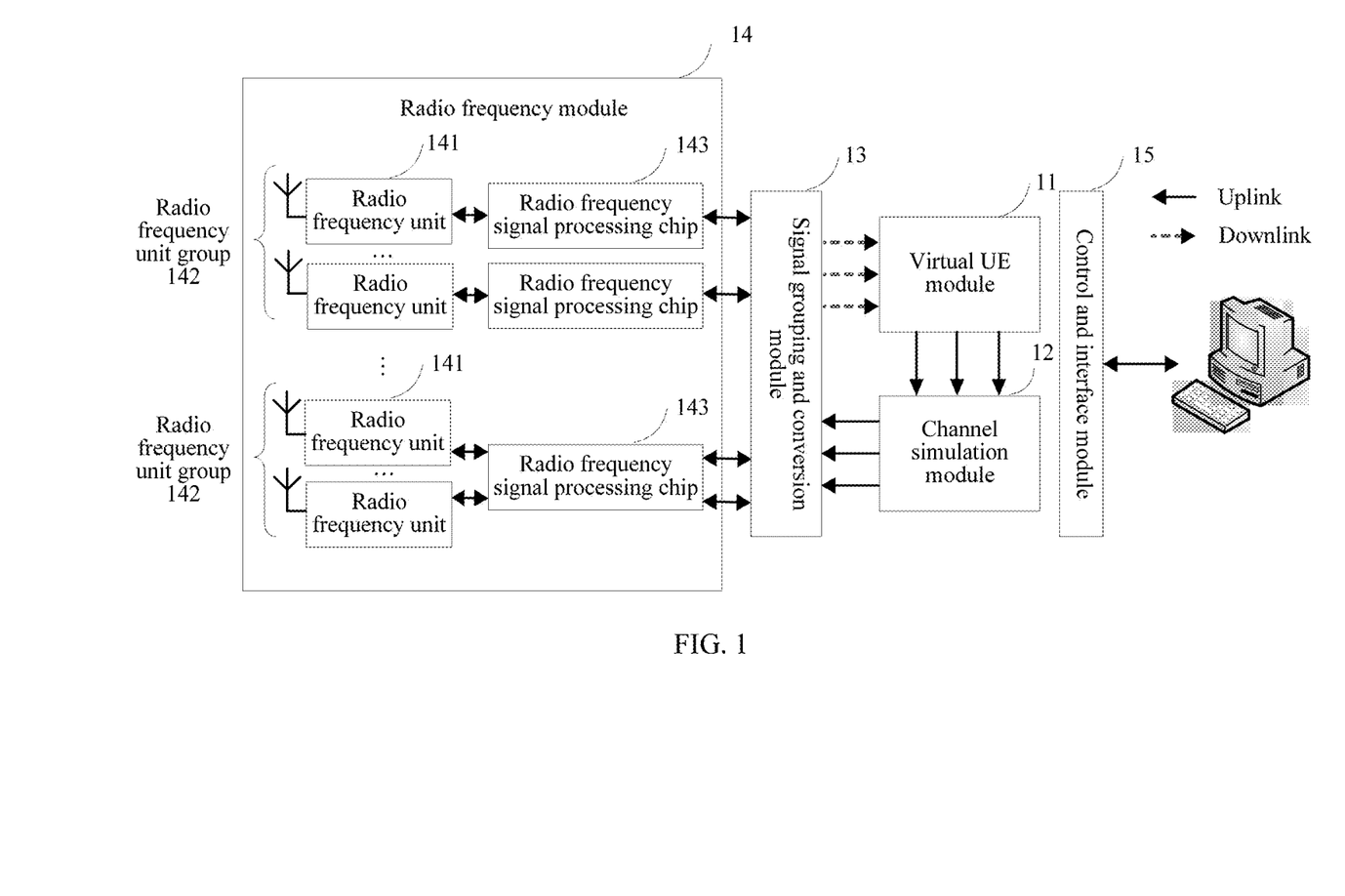
FIG. 1 is a functional block diagram of a signal output apparatus according to an embodiment of the present invention.

Referring to FIG. 1, FIG. 1 is a functional block diagram of a signal output apparatus according to an embodiment of the present invention. The apparatus includes the following structure: a virtual UE module 11, a channel simulation module 12, a signal grouping and conversion module 13, and a radio frequency module 14.

The virtual UE module 11 is configured to generate multiple UE baseband signals.

The channel simulation module 12 is configured to add a radio frequency characteristic to each of the multiple UE baseband signals generated by the virtual UE module 11, to obtain multiple UE characteristic signals.

The radio frequency module 14, where the radio frequency module includes N radio frequency units 141.

It should be noted that, the N radio frequency units 141 herein refer to a quantity, which is set according to a test requirement, of radio frequency units 141 that are available in the apparatus in this test, and a total quantity of radio frequency units 141 actually included in the radio frequency module 14 may be greater than N.

The signal grouping and conversion module 13 is configured to: generate N signal groups according to the multiple UE characteristic signals obtained by the channel simulation module 12, where each signal group includes at least one of the multiple UE characteristic signals, and the N signal groups form a UE characteristic signal set that is the same as a set including the multiple UE characteristic signals obtained by the channel simulation module 12; and combine UE characteristic signals included in each of the N signal groups, and respectively bind N combined signals obtained through combination to the N radio frequency units 141 included in the radio frequency module 14. A ratio of a sum of peak powers of the UE characteristic signals included in each signal group to a sum of average powers within a specified power identification duration is not greater than a specified peak-to-average power ratio (English: Peak to Average Power Ratio, PAPR for short) threshold.

The radio frequency module 14 is configured to respectively output, by using antennas connected to the N radio frequency units 141, the combined signals that are bound by the signal grouping and conversion module 13 to the N radio frequency units 141.

The modules are separately described below.

1. Virtual UE Module 11

Figure 2:
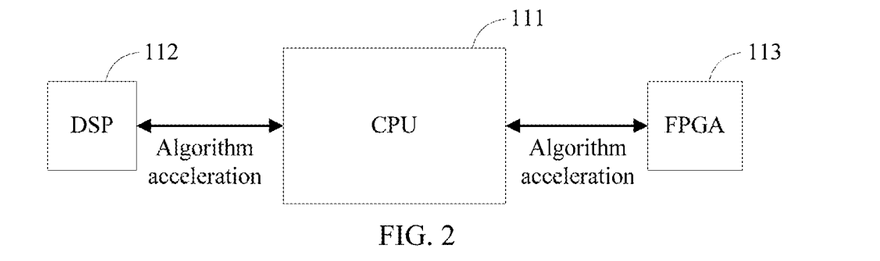
FIG. 2 is a schematic structural diagram of a virtual UE module according to an embodiment of the present invention.

Referring to FIG. 2, the virtual UE module 11 may have an architecture of "central processing unit (English: Central Processing Unit, CPU for short)+DSP and/or FPGA".

The CPU 111 is configured to generate the multiple UE baseband signals.

The DSP 112 and/or the FPGA 113 is configured to accelerate a process of generating the multiple UE baseband signals by the CPU 111.

In this embodiment of the present invention, a baseband signal processing function is implemented in the CPU by using a software program, that is, a "soft baseband" architecture is used. The DSP and/or the FPGA is used to accelerate all or some of algorithms (for example, algorithms with large arithmetic quantities, such as channel estimation and equalization and channel decoding) used in the process of generating the baseband signals by the CPU, that is, a "hard acceleration" architecture is used. The UE simulation device that uses "DSP+FPGA" and that is mentioned in the background processes a baseband signal and accelerates a related algorithm in the DSP and the FPGA, that is, a "hard baseband" architecture is used. When statuses of hardware such as the DSPs and the FPGAs are the same, compared with the conventional architecture of "hard baseband", the architecture of "soft baseband+hard acceleration" used in this embodiment of the present invention has a stronger processing capability, and can support simulation of a larger quantity of UE baseband signals.

In some embodiments, when generating the multiple UE baseband signals, the virtual UE module 11 may generate multiple UE physical layer signals according to a specified service model or an application (English: Application, APP for short) installed in the apparatus, and then perform baseband processing on each of the generated UE physical layer signals, so as to obtain the multiple UE baseband signals.

The baseband processing includes operations such as cyclic redundancy code attachment, encoding, interleaving, scrambling, modulation, resource mapping, spreading, and revolution, is a relatively mature technology, and is not described in detail in the present invention.

The specified service model is determined according to a test requirement, and is used to simulate different actual communication services, such as File Transfer Protocol (English: File Transfer Protocol, FTP for short) services, VoLTE (English: Voice over Long Term Evolution) services, or services of an APP.

2. Channel Simulation Module 12

In this embodiment of the present invention, the channel simulation module 12 may add an independent radio frequency characteristic to each UE baseband signal by using a digital channel model. The radio frequency characteristic is dynamically changeable, and the channel simulation module 12 may simulate a physical behavior such as movement or aggregation of UE by adjusting the digital channel model.

3. Signal Grouping and Conversion Module 13

In this embodiment of the present invention, the signal grouping and conversion module 13 is specifically configured to:

first, generate M first signal groups according to the multiple UE characteristic signals obtained by the channel simulation module 12. Each first signal group includes at least one of the multiple UE characteristic signals, and the M first signal groups form a UE characteristic signal set that is the same as the set including the multiple UE characteristic signals obtained by the channel simulation module 12. M is a quantity of radio frequency unit groups 142 included in the apparatus, and each radio frequency unit group 142 includes at least one radio frequency unit 141.

For example, assuming that the signal grouping and conversion module 13 generates two first signal groups according to two UE characteristic signals obtained by the channel simulation module 12, a grouping case may be one of the following:

Case 1: A group 1 includes a UE characteristic signal 1, and a group 2 includes a UE characteristic signal 2.

Case 2: A group 1 includes a UE characteristic signal 1 and a UE characteristic signal 2, and a group 2 includes the UE characteristic signal 1 or the UE characteristic signal 2.

Case 3: A group 1 includes a UE characteristic signal 1 and a UE characteristic signal 2, and a group 2 also includes the UE characteristic signal 1 and the UE characteristic signal 2.

However, in actual application, the signal grouping and conversion module 13 may determine, according to an encoding scheme of each UE characteristic signal and a used service model, which first signal group or first signal groups includes or include the UE characteristic signal. For example, when a multiple-input multiple-output (English: Multiple-Input Multiple-Output, MIMO for short) technology is used for a UE characteristic signal, multiple first signal groups include the UE characteristic signal.

It should be noted that the quantity M of radio frequency unit groups 142 that is mentioned herein is a quantity, which is set according to a test requirement, of radio frequency unit groups 142 that are available in the apparatus in this test. For example, if a network-side device has eight antenna ports, the apparatus may be set to support eight radio frequency unit groups 142.

Then, the signal grouping and conversion module 13 binds the generated different first signal groups to different radio frequency unit groups 142, and performs the following operations for each radio frequency unit group 142:

grouping UE characteristic signals included in a first signal group bound to the radio frequency unit group 142 into n second signal groups according to the specified power identification duration, the specified PAPR threshold, and a quantity n of radio frequency units 141 included in the radio frequency unit group 142, so that a ratio of a sum of peak powers of UE characteristic signals included in any second signal group to a sum of average powers within the power identification duration is not greater than the PAPR threshold; and combining UE characteristic signals included in each of the n second signal groups obtained through grouping, and binding n combined signals obtained through combination to n radio frequency units 141 included in the radio frequency unit group 142. A sum of quantities of n second signal groups that are separately obtained for the different radio frequency unit groups 142 is the N signal groups.

In actual application, a value of the PAPR threshold is related to the specified service model and a quantity of radio frequency units included in a radio frequency unit group. For example, if the radio frequency unit group includes a relatively large quantity of radio frequency units, the PAPR threshold may be assigned a relatively small value. For another example, if the specified service model is a gentle service model, such as voice communication or a video, the PAPR threshold may be assigned a relatively small value. If the specified service model is a burst service model, such as WeChat, the PAPR threshold may be assigned a relatively large value.

Finally, the signal grouping and conversion module 13 may perform preprocessing, such as filtering or transmit level control (English: Transmitting Level Control, TLC for short) on each combined signal, and then send each processed combined signal to a radio frequency unit group and a radio frequency unit to which the combined signal is bound.

4. Radio Frequency Module 14

In this embodiment of the present invention, the radio frequency module 14 includes a configurable quantity of radio frequency units 141, and the radio frequency units 141 are grouped into multiple radio frequency unit groups 142 according to settings. Moreover, the radio frequency module 14 further includes at least one radio frequency signal processing chip 143, and each radio frequency signal processing chip 143 may be responsible for one or more radio frequency units 141.

The radio frequency signal processing chip 143 is configured to respectively process the N combined signals that are bound by the signal grouping and conversion module 13 to the N radio frequency units 141, to obtain N radio frequency signals.

Each radio frequency unit group 142 is mapped to one antenna port, and the multiple radio frequency unit groups 142 may collaboratively complete a MIMO function.

Each radio frequency unit 141 is connected to one physical antenna.

A first radio frequency unit 141 is specifically configured to output, by using a physical antenna connected to the first radio frequency unit 141 and an antenna port to which a radio frequency unit group 142 to which the first radio frequency unit 141 belongs is mapped, a radio frequency signal that is obtained by the radio frequency signal processing chip 143 by processing a combined signal bound to the first radio frequency unit 141. The first radio frequency unit 141 may be any one of the N radio frequency units 141.

In some embodiments, when outputting the radio frequency signal, the first radio frequency unit 141 is specifically configured to: determine a transmit power of the first radio frequency unit 141, and then output, based on the determined transmit power of the first radio frequency unit 141 by using the antenna connected to the first radio frequency unit 141, the combined signal that is bound by the signal grouping and conversion module 13 to the first radio frequency unit 141. The transmit power is a sum of powers of UE characteristic signals included in the combined signal that is bound by the grouping and conversion module 13 to the first radio frequency unit 141.

In some embodiments, the apparatus may further include:

a control and interface module 15, including a user interface (English: User Interface, UI for short). The UI is configured to configure a quantity of the UE baseband signals generated in the virtual UE module 11 and the used service model, the digital channel model used in the channel simulation module 12, parameters such as the power identification duration and the PAPR threshold that are used in the signal grouping and conversion module 13, a quantity of radio frequency unit groups 142 used in the radio frequency module 14, and parameters such as a quantity, locations and numbers, and signal bandwidths of radio frequency units 141 included in each radio frequency unit group 142. In addition, the control and interface module 15 further supports boards of multiple apparatus to be combined, to form a test system having a larger capacity.

Figure 3:
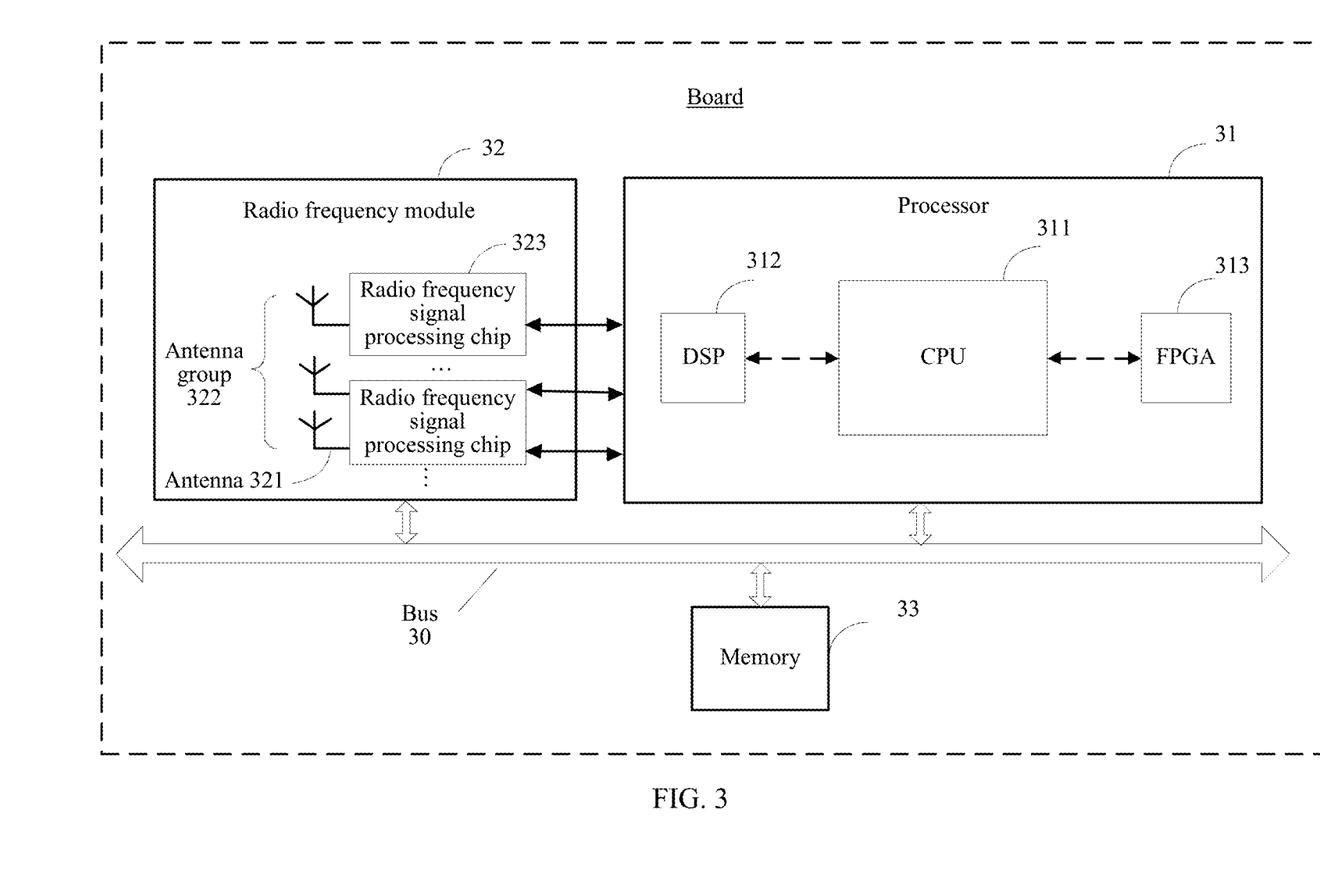
FIG. 3 is a schematic structural diagram of a board according to an embodiment of the present invention.

As shown in FIG. 3, another embodiment of the present invention further provides a board. The board includes:

a bus 30;

a processor 31 connected to the bus 30;

a radio frequency module 32 connected to the bus 30; and a memory 33 connected to the bus 30, where the radio frequency module 32 includes N antennas 321; and the processor 31 invokes, by using the bus 30, a program stored in the memory 33, so as to: generate multiple UE baseband signals; add a radio frequency characteristic to each of the generated multiple UE baseband signals, to obtain multiple UE characteristic signals; generate N signal groups according to the obtained multiple UE characteristic signals, where each signal group includes at least one of the multiple UE characteristic signals, and the N signal groups form a UE characteristic signal set that is the same as a set including the obtained multiple UE characteristic signals; and combine UE characteristic signals included in each of the N signal groups, and respectively bind N combined signals obtained through combination to the N antennas 321 included in the radio frequency module 32, where a ratio of a sum of peak powers of the UE characteristic signals included in each signal group to a sum of average powers within a specified power identification duration is not greater than a specified PAPR threshold.

The radio frequency module 32 is configured to respectively output, by using the N antennas 321, the combined signals that are bound by the processor 31 to the N antennas 321.

In some embodiments, when generating the N signal groups, combining the UE characteristic signals included in the N signal groups, and binding the N combined signals obtained through combination to the N different antennas 321, the processor 31 is specifically configured to: generate M first signal groups according to the obtained multiple UE characteristic signals, where each first signal group includes at least one of the multiple UE characteristic signals, and the M first signal groups form a UE characteristic signal set that is the same as the set including the obtained multiple UE characteristic signals, where M is a quantity of antenna groups 322 included in the radio frequency module 32, and each antenna group 322 includes at least one antenna 321; and bind the generated different first signal groups to different antenna groups 322, and perform the following operations for each antenna group 322: grouping UE characteristic signals included in a first signal group bound to the antenna group 322 into n second signal groups according to the specified power identification duration, the specified PAPR threshold, and a quantity n of antennas 321 included in the antenna group 322, so that a ratio of a sum of peak powers of UE characteristic signals included in any second signal group to a sum of average powers within the power identification duration is not greater than the PAPR threshold; and separately combine UE characteristic signals included in the n second signal groups obtained through grouping, and bind n combined signals obtained through combination to n antennas 321 included in the antenna group 322, where a sum of quantities of n second signal groups that are separately obtained for the different antenna groups 322 is the N signal groups.

In some embodiments, the processor 31 includes:

a CPU 311, configured to generate multiple UE baseband signals; add a radio frequency characteristic to each of the generated multiple UE baseband signals, to obtain multiple UE characteristic signals; generate N signal groups according to the obtained multiple UE characteristic signals; and combine UE characteristic signals included in each of the N signal groups, and bind N combined signals obtained through combination to N different antennas 321; and a DSP 312 and/or an FPGA 313, configured to accelerate a process of generating the multiple UE baseband signals by the CPU 311.

In some embodiments, when generating the multiple UE baseband signals, the processor 31 is specifically configured to: generate multiple UE physical layer signals according to a specified service model or an APP installed in the processor 31, and perform baseband processing on each of the generated UE physical layer signals, to obtain the multiple UE baseband signals.

In some embodiments, the radio frequency module 32 further includes at least one radio frequency signal processing chip 323, where each radio frequency signal processing chip 323 is connected to one or more antennas 321;

the radio frequency signal processing chip 323 is configured to process the N combined signals that are bound by the processor 31 to the N antennas 321, to obtain N radio frequency signals;

each antenna group 322 may be mapped to one antenna port; and a first antenna 321 is specifically configured to output, by using an antenna port to which an antenna group 322 to which the first antenna 321 belongs is mapped, a radio frequency signal that is obtained by the radio frequency signal processing chip 323 by processing a combined signal bound to the first antenna 321, where the first antenna 321 may be any one of the N antennas 321.

In some embodiments, the first antenna 321 is specifically configured to: determine a transmit power of the first antenna 321; and output, based on the determined transmit power, the combined signal that is bound by the processor 31 to the first antenna 321. The transmit power is a sum of powers of UE characteristic signals included in the combined signal that is bound by the processor 31 to the first antenna 321.

It should be understood that, in this embodiment of the present invention, the memory may include a read-only memory and a random access memory, and provide an instruction and data to the processor. A part of the memory may further include a non-volatile random access memory. For example, the memory may further store device type information.

The bus includes a data bus, and may further include a power bus, a control bus, a status signal bus, or the like. However, for clear description, various buses are marked as the bus in the figure.

In an implementation process, the steps of the foregoing method may be implemented by using a hardware integrated logic circuit in the processor or instructions in a form of software. Steps of the method disclosed with reference to the embodiments of the present invention may be directly performed and completed by means of a hardware processor, or may be performed and completed by using a combination of hardware and software modules in the processor. The software module may be located in a mature storage medium in the field, where the storage medium is, for example, a random access memory, a flash memory, a read-only memory, a programmable read-only memory, an electrically-erasable programmable memory, or a register. The storage medium is located in the memory, and the processor reads information in the memory and completes the steps of the foregoing methods in combination with hardware of the processor.

Figure 4:
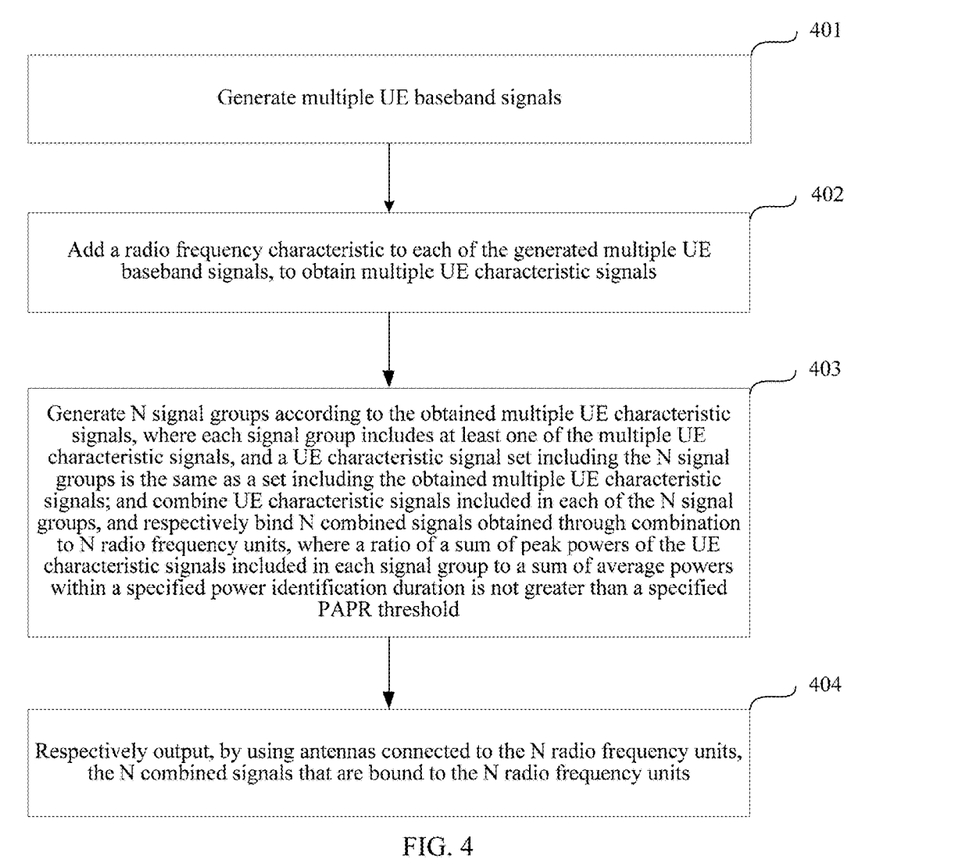
FIG. 4 is a flowchart of a signal output method according to an embodiment of the present invention.

As shown in FIG. 4, still another embodiment of the present invention provides a signal output method. An implementation process of the method is as follows:

Step 401: Generate multiple UE baseband signals.

Step 402: Add a radio frequency characteristic to each of the generated multiple UE baseband signals, to obtain multiple UE characteristic signals.

Step 403: Generate N signal groups according to the obtained multiple UE characteristic signals, where each signal group includes at least one of the multiple UE characteristic signals, and the N signal groups form a UE characteristic signal set that is the same as a set including the obtained multiple UE characteristic signals; and combine UE characteristic signals included in each of the N signal groups, and respectively bind N combined signals obtained through combination to N radio frequency units, where a ratio of a sum of peak powers of the UE characteristic signals included in each signal group to a sum of average powers within a specified power identification duration is not greater than a specified PAPR threshold.

Step 404: Respectively output, by using antennas connected to the N radio frequency units, the N combined signals that are bound to the N radio frequency units.

In some embodiments, step 403 may be implemented by using the following process.

First, M first signal groups are generated according to the obtained multiple UE characteristic signals. Each first signal group includes at least one of the multiple UE characteristic signals, and the M first signal groups form a UE characteristic signal set that is the same as the set including the obtained multiple UE characteristic signals. M is a quantity of radio frequency unit groups, and each radio frequency unit group includes at least one radio frequency unit.

Then, the generated different first signal groups are bound to different radio frequency unit groups, and the following operations are performed for each radio frequency unit group:

grouping UE characteristic signals included in a first signal group bound to the radio frequency unit group into n second signal groups according to the specified power identification duration, the specified PAPR threshold, and a quantity n of radio frequency units included in the radio frequency unit group, so that a ratio of a sum of peak powers of UE characteristic signals included in any second signal group to a sum of average powers within the power identification duration is not greater than the PAPR threshold; and combining UE characteristic signals included in each of the n second signal groups obtained through grouping, and binding n combined signals obtained through combination to n radio frequency units included in the radio frequency unit group, where a sum of quantities of n second signal groups that are separately obtained for the different radio frequency unit groups is the N signal groups.

In some embodiments, the method further includes:

accelerating, by using a DSP and/or an FPGA, a processing process of generating the multiple UE baseband signal in step 401.

In some embodiments, when the multiple UE baseband signals are generated in step 401, multiple UE physical layer signals may be first generated according to a specified service model or an installed APP, and baseband processing is then performed on each of the generated UE physical layer signals, to obtain the multiple UE baseband signals.

In some embodiments, in this embodiment of the present invention, each radio frequency unit group is mapped to one antenna port, and each radio frequency unit is connected to one physical antenna.

Correspondingly, in step 404, when the N combined signals bound to the N radio frequency units are respectively output by using the antennas connected to the N radio frequency units, the combined signal bound to the first radio frequency unit may be processed by using a radio frequency signal processing chip, to obtain a radio frequency signal, and the radio frequency signal is output by using a physical antenna connected to the first radio frequency unit and an antenna port to which a radio frequency unit group to which the first radio frequency unit belongs is mapped. The first radio frequency unit may be any one of the N radio frequency units.

In some embodiments, in step 404, when the N combined signals bound to the N radio frequency units are respectively output by using the antennas connected to the N radio frequency units, a transmit power of the first radio frequency unit may be determined, and the combined signal bound to the first radio frequency unit is output based on the determined transmit power by using the antenna connected to the first radio frequency unit. The transmit power is a sum of powers of UE characteristic signals included in the combined signal that is bound to the first radio frequency unit.

To sum up, by means of the technical solutions provided in this embodiment of the present invention, UE signals that are to be output are grouped, and UE signals having similar powers are combined and are then output by using one antenna, so that UE signals that are output by using one antenna have an optimized PAPR value. This resolves a problem that a low-power UE signal is distorted when a large quantity of UE signals are output from an air interface. In addition, in this embodiment of the present invention, a baseband signal processing function is implemented in a CPU by using a software program, and an algorithm used by the CPU to perform baseband processing is accelerated in a DSP and/or an FPGA. Compared with a conventional architecture of "hard baseband", such a processing architecture of "soft baseband+hard acceleration" has a stronger processing capability, and can support simulation of a larger quantity of UE baseband signals.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A signal output apparatus, comprising:
    a virtual user equipment (UE) module, configured to generate multiple UE baseband signals;
    a channel simulation module, configured to add a radio frequency characteristic to each of the multiple UE baseband signals generated by the virtual UE module to obtain multiple UE characteristic signals;
    a radio frequency module, wherein the radio frequency module comprises N radio frequency units; and
    a signal grouping and conversion module, configured to:
        generate N signal groups according to the multiple UE characteristic signals obtained by the channel simulation module, wherein each signal group comprises at least one of the multiple UE characteristic signals, the N signal groups form a UE characteristic signal set that is the same as a set comprising the multiple UE characteristic signals obtained by the channel simulation module; and
        combine UE characteristic signals in each of the N signal groups, and respectively bind N combined signals obtained through combination to the N radio frequency units in the radio frequency module; wherein
    a ratio of a sum of peak powers of the UE characteristic signals in each signal group to a sum of average powers within a specified power identification duration is not greater than a specified peak-to-average power ratio PAPR threshold; and
    the radio frequency module is configured to respectively output, by using antennas connected to the N radio frequency units, the combined signals that are bound by the signal grouping and conversion module to the N radio frequency units.

2. The apparatus according to claim 1, wherein the signal grouping and conversion module is specifically configured to:
    generate M first signal groups according to the multiple UE characteristic signals obtained by the channel simulation module, wherein each first signal group comprises at least one of the multiple UE characteristic signals, and the M first signal groups form a UE characteristic signal set that is the same as the set comprising the multiple UE characteristic signals obtained by the channel simulation module, wherein
    M is a quantity of radio frequency unit groups in the apparatus, and each radio frequency unit group comprises at least one radio frequency unit; and
    bind the generated different first signal groups to different radio frequency unit groups, and perform the following operations for each radio frequency unit group:
    grouping UE characteristic signals in a first signal group bound to the radio frequency unit group into n second signal groups according to the specified power identification duration, the specified PAPR threshold, and a quantity n of radio frequency units in the radio frequency unit group, so that a ratio of a sum of peak powers of UE characteristic signals in any second signal group to a sum of average powers within the power identification duration is not greater than the PAPR threshold; and
    combining UE characteristic signals in each of the n second signal groups obtained through grouping, and binding n combined signals obtained through combination to n radio frequency units in the radio frequency unit group, wherein
    a sum of quantities of n second signal groups that are separately obtained for the different radio frequency unit groups is the N signal groups.

3. The apparatus according to claim 2, wherein
    the radio frequency module further comprises a radio frequency signal processing chip;
    the radio frequency signal processing chip is configured to respectively process the N combined signals that are bound by the signal grouping and conversion module to the N radio frequency units, to obtain N radio frequency signals;
    each radio frequency unit group is mapped to one antenna port, and each radio frequency unit is connected to one physical antenna; and
    a first radio frequency unit is specifically configured to output, by using a physical antenna connected to the first radio frequency unit and an antenna port to which a radio frequency unit group to which the first radio frequency unit belongs is mapped, a radio frequency signal that is obtained by the radio frequency signal processing chip by processing a combined signal bound to the first radio frequency unit.

4. The apparatus according to claim 1, wherein the virtual UE module comprises:
    a central processing unit CPU, configured to generate the multiple UE baseband signals; and
    a digital signal processor DSP and/or a field-programmable gate array FPGA, configured to accelerate the generation of the multiple UE baseband signals.

5. The apparatus according to claim 1, wherein the virtual UE module is specifically configured to:

generate multiple UE physical layer signals according to a specified service model or an application APP installed in the apparatus; and perform baseband processing on each of the generated UE physical layer signals, to obtain the multiple UE baseband signals.

6. The apparatus according to claim 1, wherein the first radio frequency unit is specifically configured to:

determine a transmit power of the first radio frequency unit; and output, based on the determined transmit power by using the antenna connected to the first radio frequency unit, the combined signal that is bound by the signal grouping and conversion module to the first radio frequency unit, wherein the transmit power is a sum of powers of UE characteristic signals in the combined signal that is bound by the signal grouping and conversion module to the first radio frequency unit.

7. A board, comprising:

a processor, configured to: generate multiple UE baseband signals; and add a radio frequency characteristic to each of the generated multiple UE baseband signals, to obtain multiple UE characteristic signals; and a radio frequency module, wherein the radio frequency module comprises N antennas; wherein the processor is further configured to:

generate N signal groups according to the obtained multiple UE characteristic signals, wherein each signal group comprises at least one of the multiple UE characteristic signals, and the N signal groups forms a UE characteristic signal set that is the same as a set comprising the obtained multiple UE characteristic signals; and combine UE characteristic signals in each of the N signal groups, and respectively bind N combined signals obtained through combination to the N antennas in the radio frequency module;

a ratio of a sum of peak powers of the UE characteristic signals in each signal group to a sum of average powers within a specified power identification duration is not greater than a specified peak-to-average power ratio PAPR threshold; and the radio frequency module is configured to respectively output, by using the N antennas, the combined signals that are bound by the processor to the N antennas.

8. The board according to claim 7, wherein the processor is specifically configured to:

generate M first signal groups according to the obtained multiple UE characteristic signals, wherein each first signal group comprises at least one of the multiple UE characteristic signals, and the M first signal groups form a UE characteristic signal set that is the same as the set comprising the obtained multiple UE characteristic signals, wherein M is a quantity of antenna groups in the radio frequency module, and each antenna group comprises at least one antenna; and bind the generated different first signal groups to different antenna groups, and perform the following operations for each antenna group:

grouping UE characteristic signals in a first signal group bound to the antenna group into n second signal groups according to the specified power identification duration, the specified PAPR threshold, and a quantity n of antennas in the antenna group, so that a ratio of a sum of peak powers of UE characteristic signals in any second signal group to a sum of average powers within the power identification duration is not greater than the PAPR threshold; and combining UE characteristic signals in each of the n second signal groups obtained through grouping, and binding n combined signals obtained through combination to n antennas in the antenna group, wherein a sum of quantities of n second signal groups that are separately obtained for the different antenna groups is the N signal groups.

9. The board according to claim 8, wherein the radio frequency module further comprises a radio frequency signal processing chip;

the radio frequency signal processing chip is configured to process the N combined signals that are bound by the processor to the N antennas, to obtain N radio frequency signals;

each antenna group is mapped to one antenna port; and a first antenna is specifically configured to output, by using an antenna port to which an antenna group to which the first antenna belongs is mapped, a radio frequency signal that is obtained by the radio frequency signal processing chip by processing a combined signal bound to the first antenna.

10. The board according to claim 7, wherein the processor comprises:

a central processing unit CPU, configured to generate the multiple UE baseband signals; and a digital signal processor DSP and/or a field-programmable gate array FPGA, configured to accelerate the generation of the multiple UE baseband signals.

11. The board according to claim 7, wherein when generating the multiple UE baseband signals, the processor is specifically configured to:

generate multiple UE physical layer signals according to a specified service model or an APP installed in the apparatus; and perform baseband processing on each of the generated UE physical layer signals, to obtain the multiple UE baseband signals.

12. The board according to claim 7, wherein the first antenna is specifically configured to:

determine a transmit power of the first antenna; and output, based on the determined transmit power, the combined signal that is bound by the processor to the first antenna, wherein the transmit power is a sum of powers of UE characteristic signals in the combined signal that is bound by the processor to the first antenna.

13. A signal output method, comprising:

generating multiple UE baseband signals;

adding a radio frequency characteristic to each of the generated multiple UE baseband signals, to obtain multiple UE characteristic signals;

generating N signal groups according to the obtained multiple UE characteristic signals, wherein each signal group comprises at least one of the multiple UE characteristic signals, and the N signal groups form a UE characteristic signal set that is the same as a set comprising the obtained multiple UE characteristic signals; and combining UE characteristic signals in each of the N signal groups, and respectively binding N combined signals obtained through combination to N radio frequency units, wherein a ratio of a sum of peak powers of the UE characteristic signals in each signal group to a sum of average powers within a specified power identification duration is not greater than a specified peak-to-average power ratio PAPR threshold; and respectively outputting, by using antennas connected to the N radio frequency units, the N combined signals that are bound to the N radio frequency units.

14. The method according to claim 13, wherein generating N signal groups according to the obtained multiple UE characteristic signals, combining UE characteristic signals in each of the N signal groups, and respectively binding N combined signals obtained through combination to N radio frequency units comprises:

generating M first signal groups according to the obtained multiple UE characteristic signals, wherein each first signal group comprises at least one of the multiple UE characteristic signals, and the M first signal groups form a UE characteristic signal set that is the same as the set comprising the obtained multiple UE characteristic signals, wherein M is a quantity of radio frequency unit groups, and each radio frequency unit group comprises at least one radio frequency unit; and binding the generated different first signal groups to different radio frequency unit groups, and performing the following operations for each radio frequency unit group:

grouping UE characteristic signals in a first signal group bound to the radio frequency unit group into n second signal groups according to the specified power identification duration, the specified PAPR threshold, and a quantity n of radio frequency units in the radio frequency unit group, so that a ratio of a sum of peak powers of UE characteristic signals in any second signal group to a sum of average powers within the power identification duration is not greater than the PAPR threshold; and combining UE characteristic signals in each of the n second signal groups obtained through grouping, and binding n combined signals obtained through combination to n radio frequency units in the radio frequency unit group, wherein a sum of quantities of n second signal groups that are separately obtained for the different radio frequency unit groups is the N signal groups.

15. The method according to claim 14, wherein each radio frequency unit group is mapped to one antenna port, and each radio frequency unit is connected to one physical antenna; and the respectively outputting, by using antennas connected to the N radio frequency units, the N combined signals that are bound to the N radio frequency units comprises:

processing, by using the radio frequency signal processing chip, a combined signal that is bound to a first radio frequency unit, to obtain a radio frequency signal; and outputting the radio frequency signal by using a physical antenna connected to the first radio frequency unit and an antenna port to which a radio frequency unit group to which the first radio frequency unit belongs is mapped.

16. The method according to claim 13, wherein the method further comprises:

accelerating the generation of the multiple UE baseband signals.

17. The method according to claim 13, wherein the generating multiple UE baseband signals comprises:

generating multiple UE physical layer signals according to a specified service model or an installed application APP; and performing baseband processing on each of the generated UE physical layer signals, to obtain the multiple UE baseband signals.

18. The method according to claim 13, wherein the respectively outputting, by using antennas connected to the N radio frequency units, the N combined signals that are bound to the N radio frequency units comprises:

determining a transmit power of the first radio frequency unit; and outputting, based on the determined transmit power by using the antenna connected to the first radio frequency unit, the combined signal that is bound to the first radio frequency unit, wherein the transmit power is a sum of powers of UE characteristic signals in the combined signal that is bound to the first radio frequency unit.

* * * * *

UNITED STATES PATENT AND TRADEMARK OFFICE
CERTIFICATE OF CORRECTION

PATENT NO. : 10,149,181 B2  
APPLICATION NO. : 15/907232  
DATED : December 4, 2018  
INVENTOR(S) : Haoran Wang, Yecun Huang and Qiang Zhang Page 1 of 1

It is certified that error appears in the above-identified patent and that said Letters Patent is hereby corrected as shown below:

On the Title Page

Below item (65) Prior Publication Data, please insert the following information:
-- Related U.S. Application Data
(63) Continuation of Application No. PCT/CN2016/070814, filed on Jan. 13, 2016. --

Signed and Sealed this
Fifth Day of February, 2019

Andrei Iancu
*Director of the United States Patent and Trademark Office*